UNITED STATES PATENT OFFICE.

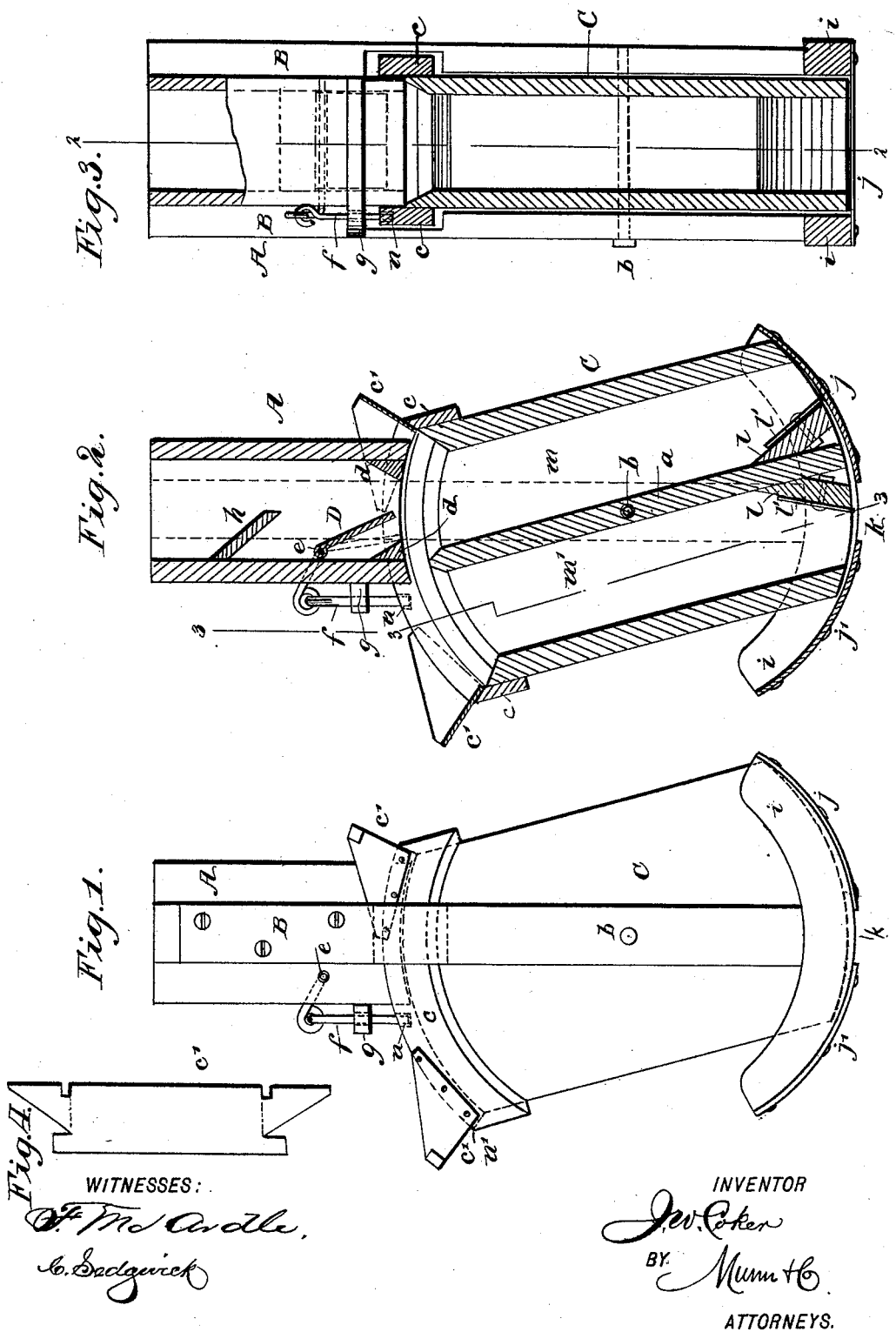

JAMES W. COKER, OF NILES, MICHIGAN, ASSIGNOR TO HIMSELF AND PAUL SKALLA, OF SAME PLACE.

GRAIN-METER.

SPECIFICATION forming part of Letters Patent No. 519,176, dated May 1, 1894.

Application filed April 27, 1893. Serial No. 472,043. (No model.)

*To all whom it may concern:*

Be it known that I, JAMES W. COKER, of Niles, in the county of Berrien and State of Michigan, have invented a new and Improved Grain-Meter, of which the following is a specification, reference being had to the annexed drawings, forming a part thereof, in which—

Figure 1 is a side elevation of my improved grain meter. Fig. 2 is a vertical transverse section taken on line 2—2 in Fig. 3. Fig. 3 is a vertical section taken on line 3—3 in Fig. 2; the deflectors $c'$ being omitted; and Fig. 4 is a face view of the blank from which the deflectors are formed.

Similar letters of reference indicate corresponding parts in all the views.

The object of my invention is to construct a grain meter which may be attached to an ordinary grain chute, and which will automatically measure and discharge the grain.

To this end my invention consists of certain features of construction, and combinations of the same, that will be hereinafter described and claimed.

To the grain chute A are attached the bars B, between which is placed the box C, which is provided with a central partition $a$, the said box being suspended upon a rod $b$ passing through the bars B, and through the sides and central partition of the box. The upper and lower ends of the box C are cut off circularly, with the pivotal rod $b$ as the center of curvature. The upper end of the box C is provided with a strip $c$, which passes entirely around it and projects above it a short distance beyond the lower end of the chute A. The upper edges of the walls of the box C and the partition, are beveled to facilitate the entrance of the grain, and the lower end of the chute A is provided with bevel fillets $d$, which contract the opening and insure the passage of the grain from the chute to the compartments of the box C.

In the chute A, near the lower end thereof, is pivoted a wing D, the rod $e$ to which it is attached being extended through the wall of the chute and connected with a bolt or latch $f$ arranged to slide in a guide $g$ secured to the side of the chute. In the chute A, above the wing D, is placed a deflector $h$, which causes the grain to flow toward the opposite side of the chute. To the lower ends of the bars B are secured curved bars $i$, and to the said bars are fastened curved metallic plates $j, j'$, leaving a central discharge opening $k$. The curve on which the plates $j, j'$ are bent, has a less radius than that of the curve of the end of the box C.

In each compartment of the box C, at the bottom thereof, is placed a deflector consisting of a board $l$, which is secured to the central partition $a$, and a metal plate $l'$, which is attached to the said board and touches the curved bottom plate to make a close joint while the compartment to which the plate belongs is being filled. As the grain flows through the chute A into one of the compartments, say the compartment $m$, it is retained in the said compartment by the curved plate $j$, which temporarily forms the bottom of the chamber. When the grain reaches the top of the box C and piles up on the contents of the compartment $m$, it depresses the wing D, and lifts the bolt $f$ out of the socket or notch $n$, formed in the upper edge of the box C, thus releasing the box and allowing it to tilt by its own gravity, bringing the compartment $m'$ under the chute, at the same time bringing the notch $n'$ into position to receive the bolt $f$. As soon as the compartment $m'$ is filled, the wing D is again depressed, thus withdrawing the bolt $f$ from the notch $n'$, allowing the box C to tilt in the opposite direction. When the box tilts in either direction it brings one of the compartments into communication with the opening $k$, thus permitting the discharge of the grain.

To the upper end of the box C, are secured sheet iron deflectors $c'$, formed of the blank shown in Fig. 4. These deflectors partly surround the top of each compartment, and serve to guide the grain to the compartment, and also to prevent it from spilling over the top of the box as it is oscillated on its pivot.

Having thus described my invention, I claim as new and desire to secure by Letters Patent—

1. In a grain meter, the combination, with a stationary grain chute, of a stationary pivot located below the chute, a tilting comparted box mounted to turn on the said stationary pivot and provided with two notches arranged substantially in a circle whose plane is perpendicular to the said pivot, a stationary curved apertured plate acting as a bottom to the comparted box, a movable wing in the chute, and a latch operatively connected with the said wing and adapted to engage either of the said notches to lock the tilting box in either of its normal positions, as set forth.

2. In a grain meter, the combination, with the comparted tilting box whose lower end is cut off circularly, of a curved apertured plate located adjacent to the lower end of the box, the curve of the plate having a less radius than that of the box, and deflectors secured within the box and adapted to move into contact with the said curved plate, substantially as described.

3. The combination in a grain meter, of the chute A furnished with the beveled fillets $d$, the deflector $h$, the wing D and the locking mechanism operated thereby, the tilting comparted box C, provided with the deflectors, and the stationary curved plates $j$, $j'$, substantially as specified.

JAMES W. COKER.

Witnesses:
GEO. F. B. COLLINS,
FRED ROEGER.